United States Patent [19]

Reed

[11] 4,315,950
[45] Feb. 16, 1982

[54] METHOD FOR COOKING HAMBURGER PATTIES

[75] Inventor: Claude A. Reed, Omaha, Nebr.

[73] Assignee: International Food Equipment, Inc., Peoria, Ill.

[21] Appl. No.: 170,720

[22] Filed: Jul. 21, 1980

Related U.S. Application Data

[60] Division of Ser. No. 909,795, May 26, 1978, Pat. No. 4,261,258, which is a continuation of Ser. No. 719,585, Sep. 1, 1976, abandoned, which is a continuation-in-part of Ser. No. 446,951, Feb. 28, 1974, Pat. No. 3,996,847, which is a continuation-in-part of Ser. No. 190,254, Oct. 18, 1971, abandoned.

[51] Int. Cl.³ .............................................. A23L 1/01
[52] U.S. Cl. ..................................... 426/509; 426/523
[58] Field of Search ............... 426/132, 641, 646, 509, 426/513, 523; 99/352, 404, 407, 419, 420, 421 R, 421 H, 421 V, 403, 358

[56] References Cited

U.S. PATENT DOCUMENTS

| 267,535 | 11/1882 | Hurd | 99/419 X |
|---|---|---|---|
| 863,717 | 6/1906 | Jamison . | |
| 1,854,850 | 4/1932 | Linkenauger | 99/421 V |
| 1,915,962 | 6/1933 | Vaughn | 99/419 |
| 2,022,842 | 12/1935 | Boettcher | 17/25 |
| 2,447,039 | 8/1948 | Stabler . | |
| 2,552,621 | 5/1951 | Clay | 99/420 X |
| 2,718,188 | 9/1955 | Read et al. | 99/352 X |
| 2,720,157 | 10/1955 | Harrison | 99/353 |
| 2,770,182 | 11/1956 | Jensen | 99/373 |
| 2,773,442 | 12/1955 | Contreras | 99/404 |
| 2,835,480 | 5/1958 | Perez | 99/419 X |
| 2,890,644 | 6/1959 | Porter | 99/358 X |
| 3,361,054 | 1/1968 | Lampe et al. | 99/420 |
| 3,602,130 | 8/1971 | Perez | 99/404 |
| 3,635,149 | 1/1972 | Smith et al. | 99/404 |
| 3,709,141 | 1/1973 | Schwartzstein | 99/419 X |

*Primary Examiner*—Arthur L. Corbin
*Attorney, Agent, or Firm*—Hume, Clement, Brinks, Willian & Olds, Ltd.

[57] ABSTRACT

Hamburger patties are rapidly cooked with reduced shrinkage in a water base cooking liquid. A cooking appliance is provided having a plurality of parallel spaced heat transfer fins. An array of projecting cooking grills on which the hamburger patty is impaled are thermally connected to said heat transfer fins. This composite cooking appliance is introduced into a water base liquid heating medium so that heat is transferred through the fins and projecting grills to the interior of the hamburger patty. In this way cooking is accomplished in a relatively short period of time, and the amount of fat and meat juices that are melted or boiled away is reduced. An ejector is adapted to fit between the projecting cooking grills in order to remove the food patty after cooking is completed.

8 Claims, 15 Drawing Figures

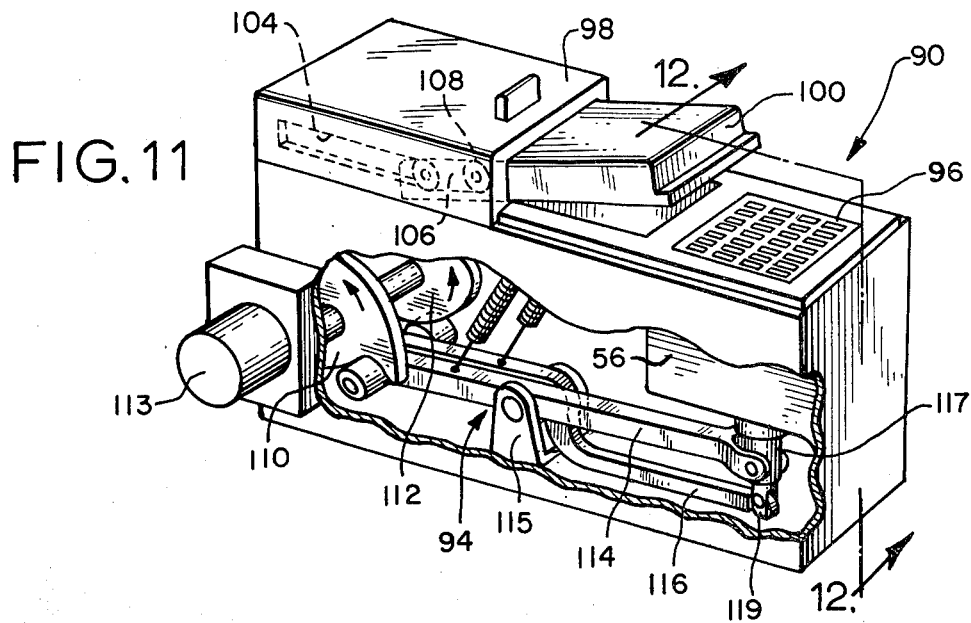
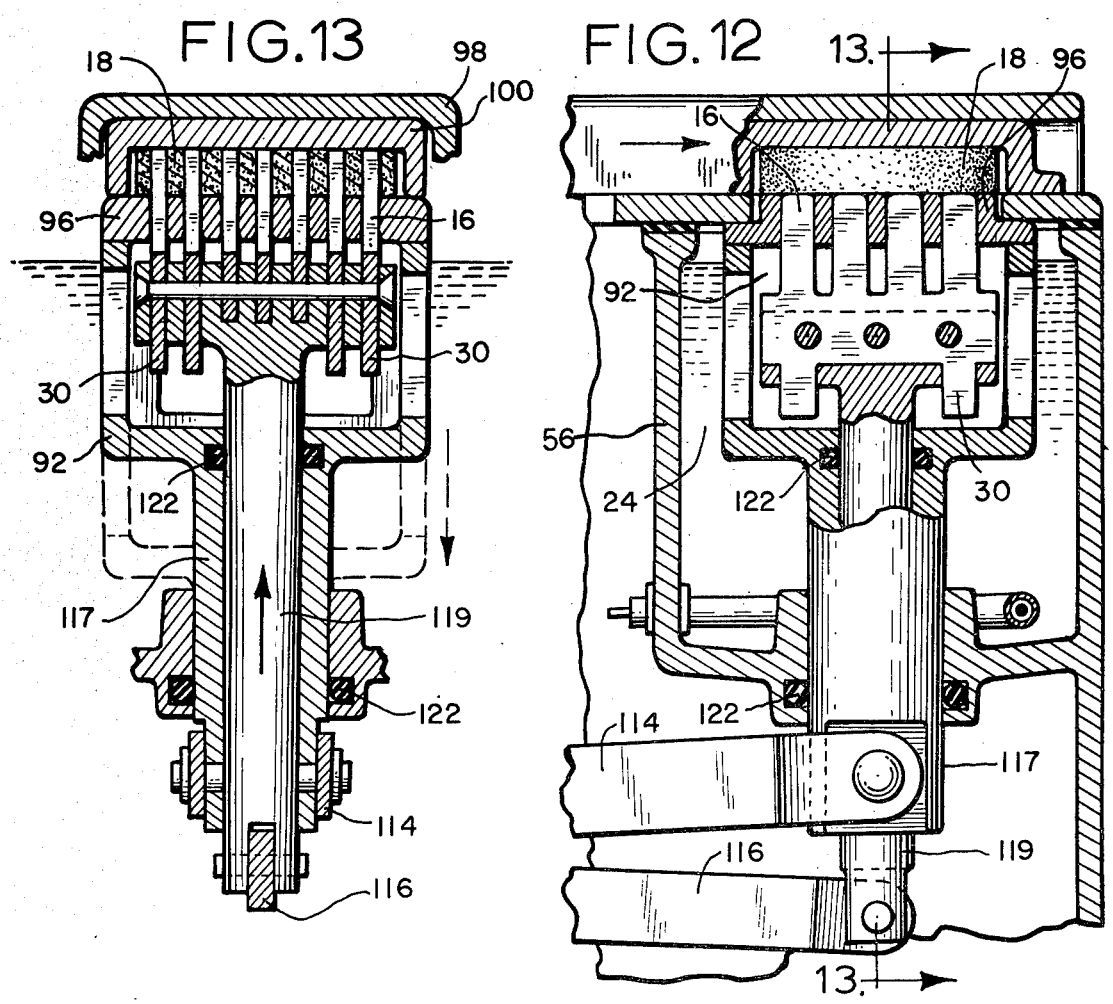

METHOD FOR COOKING HAMBURGER PATTIES

This application is a division of application Ser. No. 909,795, filed May 26, 1978, now U.S. Pat. No. 4,261,258, which is a continuation of application Ser. No. 719,585, filed Sept. 1, 1976, now abandoned, which was a continuation-in-part of application Ser. No. 446,951, filed Feb. 28, 1974, now U.S. Pat. No. 3,996,847, which was a continuation-in-part of patent application Ser. No. 190,254, filed Oct. 18, 1971, now abandoned.

BACKGROUND OF THE INVENTION

The present invention relates to a method for cooking food products such as hamburger patties. More particularly, the method of the invention pertains to rapidly and efficiently cooking such products in fast food service restaurants.

Depending on how they are cooked, hamburgers are a delicious, succulent food, and as a result, many restaurants all across the country specialize in serving this singular menu item. It is well known that the ingredients which contribute to the unique taste of hamburger are the fats and meat juices. Beef tallow, however, has a relatively low solidification point within the range of 88°–100° F. and, therefore, hamburgers are preferably formed into relatively thick patties and cooked at relatively low temperatures to prevent the tasty fats and meat juices from being melted or boiled away. Nonetheless, for reasons explained more fully hereinafter, fast food restaurants have found it commercially expedient to use relatively thin patties and cook them at relatively high temperatures in order to reduce the preparation time.

At the present time there are a wide variety of fast food restaurants which sell hamburgers and similar food items. Necessary to the success of such fast food operations is the ability to rapidly cook, garnish and serve hamburgers. It has become an accepted practice in the fast food industry to roll or press hamburgers into relatively thin patties, usually less than $\frac{1}{4}''$, in order to decrease the amount of time necessary to cook them thoroughly. In particular, it has been found that by reducing the thickness of the hamburger patties, the distance the heat must travel through each patty is reduced, thereby reducing the amount of time necessary to cook the meat.

Though tastes differ, it has been found that the interior of a $\frac{1}{4}$ lb. hamburger patty must be heated to a temperature of 140° to 170°, which temperature must be sustained for 25 seconds before the patty is considered sufficiently done. To rapidly achieve this interior temperature, the exterior surfaces of the hamburger patty are subjected to relatively high temperatures, generally between 325° and 600° F. For example, by conventional means it will take 150 seconds to cook a 1.6 oz. hamburger. The large majority of this time, 125 seconds, is used to heat the patty up to the flavor cooking temperature range (140° to 170° F.). The remaining 25 seconds actually cooks the interior of the patty. Establishments which cook hamburgers in this manner sometimes utilize an open griddle which is operated by at least one attendant. As such, relatively large amounts of heat energy and a relatively large amount of manpower is required to prepare hamburgers in this manner.

During cooking on an open grill there is a tendency for the hamburger patty to crawl together, shrink in diameter, and become thick in the center. This not only creates an undesirable appearance, it also creates cooking problems because the increased thickness requires higher temperatures, longer cooking time, or both. Increasing the cooking conditions tends to reduce the amount of fat and juices in the patty so that there is not only a weight loss, but the product also tends to have a dry taste.

A popular alternative to the grill method of preparing hamburgers is the use of a boiler having heating elements inside a cabinet or hotbox. A chain conveyor carries the hamburger patties through the hotbox, and by adjusting the speed of the conveyor, the thickness of the hamburger patties, and the temperature of the heating elements, the hamburger patties can be rapidly cooked to the desired temperatures with minimal supervision. The temperatures of the heaters used in hotboxes of the type described varies between 350° F. and 700° F., but since the heaters can be disposed above and below the chain conveyor, the hamburger can be heated on both sides simultaneously, or consecutively. As a result, hamburgers are cooked by the broiler method in approximately half of the time normally required by the grill method, and with a minimal amount of manpower.

Though the broiler method of cooking hamburgers is successfully used in fast food restaurant operations, it is also subject to numerous drawbacks. There are a number of variable conditions in the broiler which as a practicable matter must remain fixed; namely, speed of the conveyor and the temperatures of the heaters; and this has disadvantages. For example, it is commercially impractical to cook hamburgers of both thin ($\frac{1}{4}$ inch) and thick ($\frac{3}{4}$ inch) sizes by the broiler method because that necessitates changing cooking conditions which is impractical.

Most importantly, both the grill method and the broiler method of cooking hamburgers rely on the relatively slow process of heat conduction through the hamburger patty itself. Thus, while one must wait for the interior of the hamburger patty to reach the flavor cooking temperature range (140°–170° F.), the exterior portions are being directly exposed to relatively high temperatures for up to 150 seconds. During this period of time, the fats and meat juices located near the more exterior portions of the hamburger patty are melted or boiled away, causing a noticeable loss of taste. In addition, a substantial amount of shrinkage results, a factor of increasing importance in an era of burgeoning meat prices.

For all these reasons, the hamburger prepared in fast food operations is often characterized by relatively thin, shriveled patties having a bland taste. In contrast to the hamburgers prepared in fast food restaurants, the hamburgers prepared in the home, where high speed preparation is not of the essence, are often thicker, juicier, and tastier. The primary reason for this difference is that hamburgers prepared at home can be cooked slowly at lower temperatures. The relatively long period of time required to produce such a product is wholly impractical for fast food operations, and therefore, compromise in taste and thickness must be made.

Accordingly, it is a primary object of this invention to provide an improved method and apparatus for rapid, efficient, and economical heating of food products, such as hamburger patties, as may be preformed in fast food service restaurants.

It is another object of this invention to provide a relatively compact, automated appliance for promoting the rapid cooking of food products of the type normally shaped into patties.

It is a further object of this invention to provide a mobile appliance for impaling and holding a quantity of food, and carrying said quantity fo food through a broiler.

It is still a further object of this invention to provide a method and apparatus for rapidly cooking proteinaceous food, particularly hamburgers, with a minimal amount of heat energy and at a minimal temperature.

A still further object of this invention is to provide improved means for rapidly, and substantially uniformly, transferring heat throughout the interior of a quantity of food, particularly hamburgers.

Still another object of this invention is to provide improved means for rapidly cooking a relatively thick hamburger patty with a minimal amount of heat energy.

Still another object of this invention is to provide an appliance, having a plurality of projecting grills extending therefrom, for impaling and holding a quantity of proteinaceous food, and carrying said quantity of food through a broiler, and passing heat substantially uniformly from the broiler, through the projecting grills, to the interior of the food impaled and held thereon.

Still another object of this invention is to provide an improved method and apparatus for removing a quantity of food impaled and held on an appliance.

Still another object of this invention is to provide an improved method and apparatus for engaging and disengaging a hot appliance, having a plurality of projection extending therefrom, used for impaling and holding a quantity of food.

Still another object of this invention is to provide an improved method for cooking a proteinaceous food patty, particularly hamburgers by rapidly bringing the interior of such patty rapidly to cooking temperatures in the range from 140° F. to 170° F.

Still another object of this invention is to provide an improved method for carrying food through a broiler.

Still another object of this invention is to provide an improved method for rapidly cooking a quantity of proteinaceous food.

Still another object of this invention is to interiorily place all heated surfaces to entrap virtually all cooking heat and odors, thus reducing heating energy required in the cooking process by more than 75%.

Other objects, features and advantages of this invention will become apparent upon reading the following detailed description in conjunction with the accompanying drawings.

SUMMARY OF THE INVENTION

According to this invention there is provided a method for heating a food article having a plurality of spaced heat transfer fins which are thermally connected through a movable mounting means to a plurality of projecting grills which are insertable into the food. The movable mounting means according to one embodiment is a continuous conveyor, but in another embodiment of the present invention is a reciprocable frame. A heating medium is provided which, through the fins and the grill means, heats the patty evenly and at a relatively low temperature. Finally, ejection means which fit between the grill means remove the patty from the grill means following the cooking operation.

A BRIEF DESCRIPTION OF THE DRAWINGS

The novel features which are believed to be characteristic of the invention are set forth in the appended claims. The invention itself, however, together with further objects and attendant advantages thereof, will be best understood by reference to the following description taken in conjunction with the accompanying drawings, in which:

FIG. 6 is a sectional view of the placer taken along lines 6—6 of FIG. 2a;

FIG. 7 is a sectional view of the presser taken along lines 7—7 of FIG. 2a;

FIG. 8 is a sectional view of the brander taken along line 8—8 of FIG. 2a;

FIG. 11 is a partially cutaway perspective view of a second embodiment of the invention;

FIG. 12 is a sectional view of the second embodiment taken along lines 12—12 of FIG. 11; and FIG. 13 is a sectional view of the second embodiment taken along lines 13—13 of FIG. 12.

DESCRIPTION OF THE PREFERRED EMBODIMENTS

Figure 1:
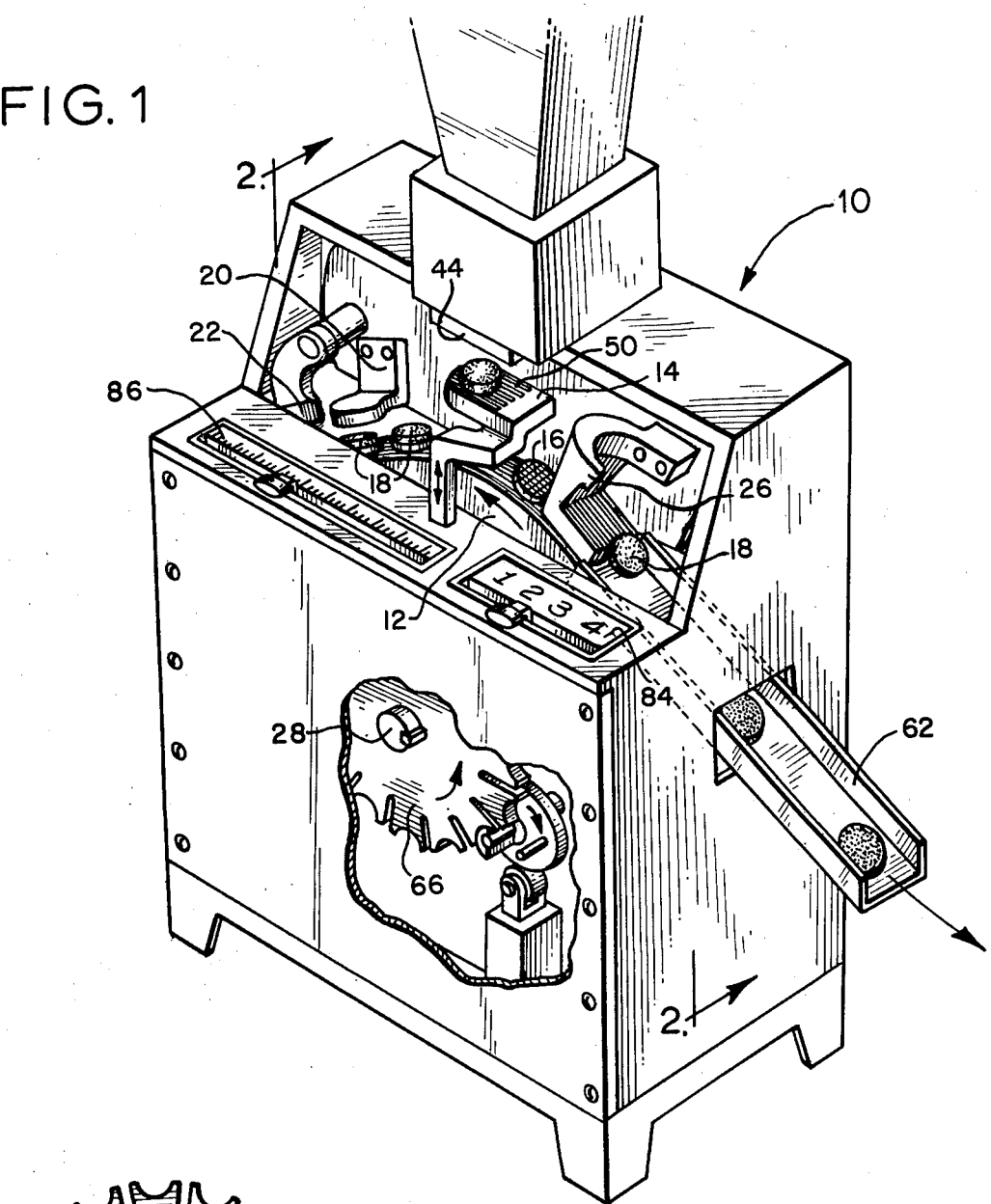
FIG. 1 is a perspective view of the appliance.
Figure 1A:
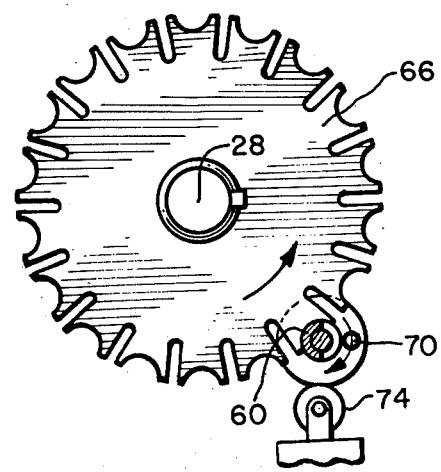
FIG. 1a is a side view of the geneva mechanism which drives the conveyor wheel.

The method of the invention permits the rapid cooking of thick, tasty hamburgers, of the type capable of being prepared in the home, with a minimal amount of heat energy, shrinkage, and manpower. Briefly stated, a food patty is pressed onto projecting grill means so that the grill means substantially penetrate the patty while retaining the desired patty shape. The grill means are then heated through the heat transfer fins so that the food patty is cooked evenly throughout its thickness. After the patty has been subjected to a sufficient amount of heat, the patty is removed from the grill means.

The appliance of the invention is mobile, easily handled, and readily passed through a cooking environment so as to cook the hamburger patty with minimal manpower. As a result, a hamburger patty can be heated to desired temperatures in much less time than is required by conventional means. Alternatively, a hamburger of much greater thickness, including those up to $\frac{3}{4}$ inches thick, can be cooked in less time than it takes to cook a $\frac{1}{4}$ inch hamburger patty by conventional methods. In either situation, the exterior portions of the patty will not be subjected to a relatively large amount of heat for a relatively long period of time, thereby reducing the amount of fat and meat juices that are ordinarily melted or boiled away. This, in turn, greatly reduces the amount of shrinkage. Additionally, less heat energy will be required to cook the same amount of hamburger meat. The apparatus and method of the invention are thus capable of producing a thicker, tastier hamburger in reduced time, while simultaneously providing great savings in both meat and energy.

Referring now to the figures, an appliance 10, described in greater detail hereinafter, carries a quantity of food to be heated through a cooking medium. Appliance 10 is specifically adapted to carry hamburger patties, though it can hold a wide variety of food items. In that form of the invention chosen for purposes of illustration in the drawings, the continuous conveyor is depicted as a circular wheel 12. The wheel 12 carries a portion of food through the various stations of the appliance. At the first station is a placer 14 which deposits the patty on a grill array 16 which is made up of micro grills, after which the patty 18 is pressed onto the grill array by press 20. A brander 22 is shown in the drawings which has the function of imparting char marks to the patty. This station is optional and may be omitted entirely. The patty is then carried through the heating medium which here is shown as hot grease 24. After the wheel 12 removes the cooked patty 18 from the heating medium, the patty is ejected from the grill array 16 by ejector means 26.

Figure 2:
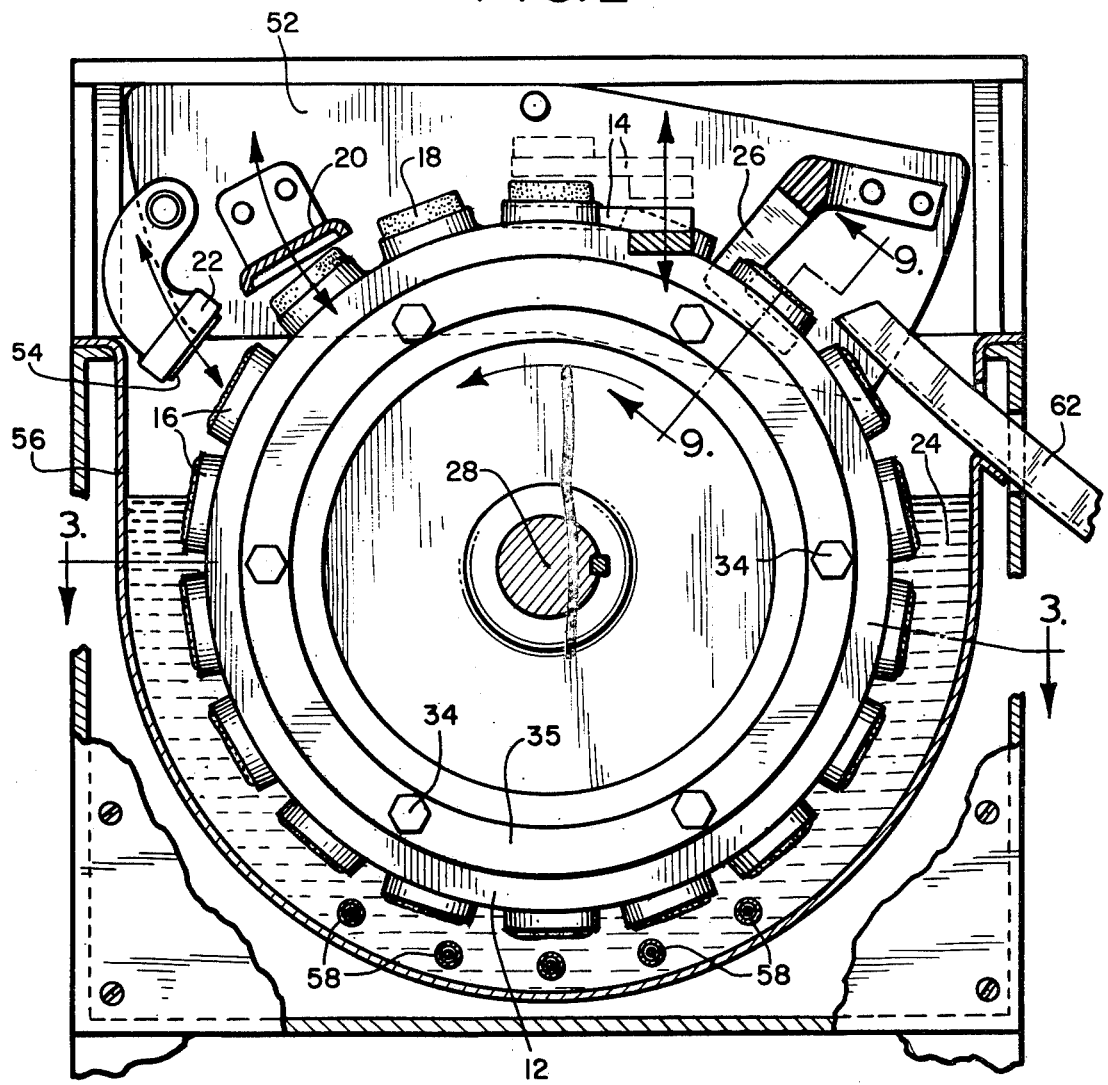
FIG. 2 is a cutaway side view of the appliance in the position where one patty is about to be pressed onto the grill array and a cooked patty is about to be ejected.
Figure 3:
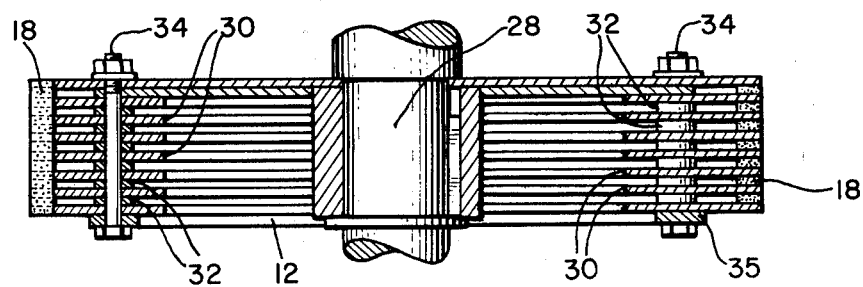
FIG. 3 is a sectional view of the conveyor wheel taken along lines 3—3 of FIG. 2.

The conveyor wheel 12, shown in detail in FIGS. 2 and 3 is fixed to rotatable shaft 28. Parallel spaced heat transfer fins 30 which are mounted on the inner periphery of wheel 12 can be best seen in FIGS. 3 and 5.

Figure 5:
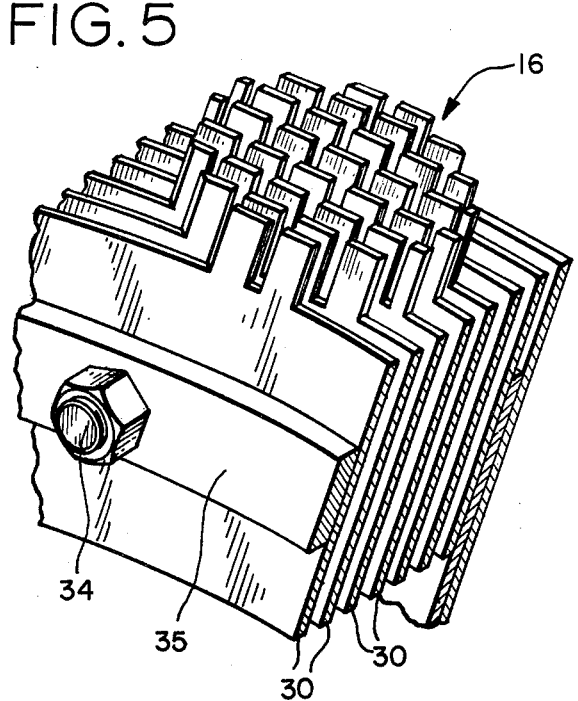
FIG. 5 is a cutaway perspective view of the conveyor wheel showing one grill array.
Figure 6:
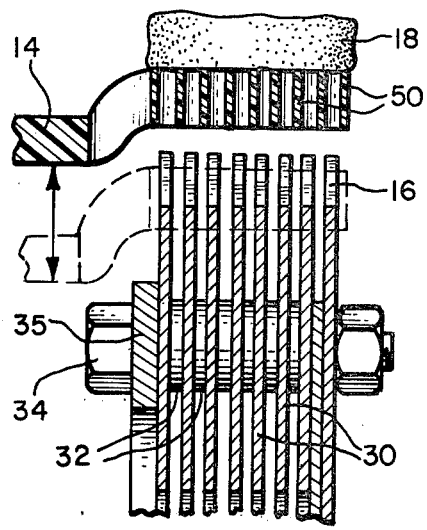

Projecting grill means 16 mounted on the outer periphery of wheel 12 are in the form of grill arrays and, in the depicted appliance, are of substantially uniform cross section. They are ordinarily of substantially rectangular configuration, as depicted, and should be spaced between $\frac{1}{4}''$ and $\frac{1}{8}''$ apart. As seen in FIG. 5 the grill arrays take the general configuration of the patties to be impaled therein.

The fins 30 are preferably connected to the micro grills 16 or, as shown in the drawings, comprise a single piece of material. Heat conductive material such as aluminum is used so that substantial amounts of heat which are presented to the fins 30 are transmitted through the micro grills 16 to the interior of the patty. Heat conductive washers 32 along with bolts 34 and axial ring 35 retain the proper position of the fins in wheel 12.

Figure 4:
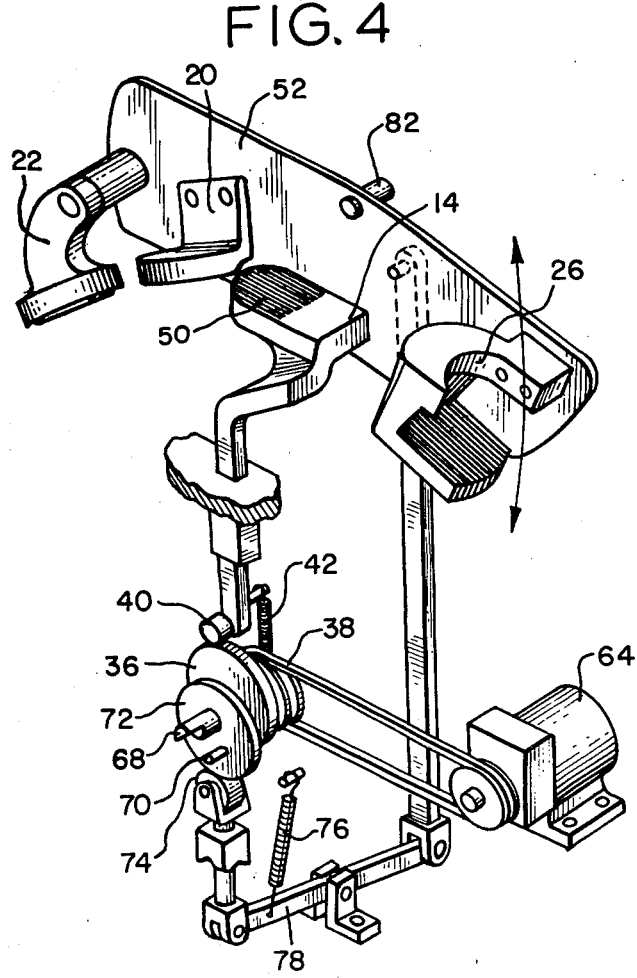
FIG. 4 is a schematic view of the drive mechanism.

The placer 14 is a substantially horizontal reciprocable platform comprised at least partially of ribs 50 which fit between the micro grills 16. In the appliance depicted in FIG. 4, the vertical position of the placer is regulated by placer cam 36 which is mounted for rotation with drive shaft 38. Placer cam follower 40 is a conventional roller follower and is biased toward cam 36 by spring 42. The placer 14 in FIG. 1 is shown in an intermediate position below the dispenser 44 which is of conventional design. The Hollymatic 200 Food Forming Machine has been found to be suitable for use with the present apparatus. The placer 14 ascends from its depicted position to accept a patty 18 from dispenser 44 and at the appropriate time descends to a point between the micro grills 16 so that the patty is left on the top of the grills. After the rotation of the conveyor wheel 12 removes the grill from between the ribs 50 of the placer 14, which grills now carry the patty 18, the placer ascends to its initial position to receive the next patty.

Figure 7:
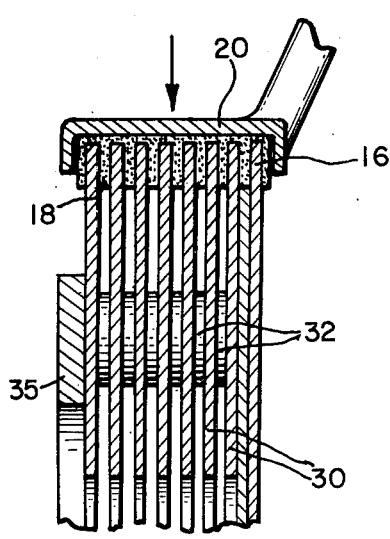

The press 20, shown in cross section in FIG. 7 compresses the patty onto the grill array so that the grills penetrate the patty transversely from the one side to at least about adjacent the opposite side of the patty while retaining the desired shape of the patty 18. After the patty has been pressed onto the grills, the presser moves upward to its original position. The vertical reciprocation of the press in the illustrated appliance is provided by rocker plate 52, which will be described in detail hereinafter.

Figure 8:
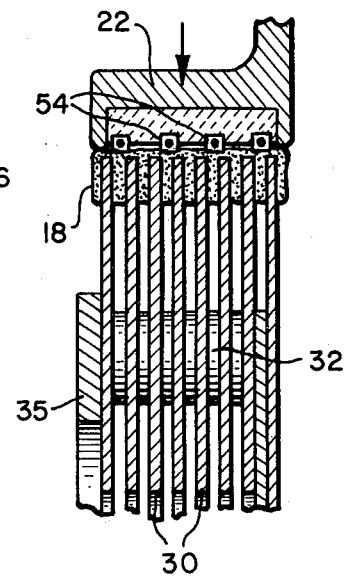

Brander 22, shown in detail in FIG. 8, is used to impart desired char pattern to the upper surface of the patty. This pattern may be in the form of parallel grid marks as in the illustrated apparatus so that the finished product would look as if it had been cooked on an open grill. Alternatively, the retailer's logo may be imprinted on the patty. As with the press, the brander 22 is reciprocated by the rocker plate 52 to which it is mounted. Brander calrods 54 are imbedded in the brander as a heat source. Alternately, the entire surface may be charred to the degree desired for flavor enhancement or cosmetic appeal by use of a heated disc.

The conveyor wheel 12 is immersed in reservoir 56 containing hot fluid medium 24. The fluid cooking medium may be a liquid, such as a cooking oil, for instance, beef tallow, or a water base cooking liquid. A liquid cooking medium is preferred, and a water base cooking medium is most desirable. The reservoir 56 may be a simple tub as illustrated with heating elements 58 therein or may have circulation lines leading to and from a heat exchanger. A temperature range of between about 160° and 220° has been found suitable. In the case of a water base cooking medium, the temperatures may range from about 160° F. to 210° F. for rapid, even cooking and which results in minimal loss to the hamburger.

Figure 9:
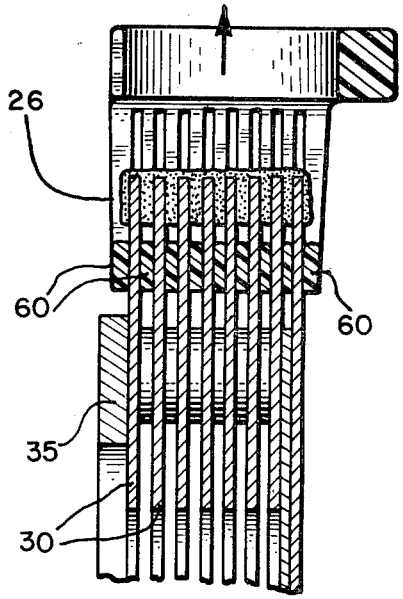
FIG. 9 is a sectional view of the ejector taken along lines 9—9 of FIG. 2.

Patty remover or ejector 26 can be best seen in FIGS. 2 and 9 and is adapted to be associated with the conveyor wheel 12 and the micro grills 16, while being independently mounted on rocker plate 52 for reciprocation. The ejector 26 has parallel ribs 60 which fit between the micro grills 16. As seen in the drawings, the ejector ribs 60 fit below the level of the micro grills. In this lowered position, shown in FIGS. 2 and 9, the conveyor wheel 12 carries a grill array with a patty impaled thereon into position above the ejector ribs 60. At this point the ejector ascends to cleanly remove the patty from the grill array. Chute 62 is provided to remove the cooked patties.

The appliance 10 of the present invention may be driven by any conventional means. In the appliance illustrated in FIG. 4 drive shaft 38 is belt driven by motor 64. As mentioned above, placer can 36 mounted on drive shaft 38 regulates the reciprocation of placer 14 through placer follower 40. The conveyor wheel 12 is rotated by drive shaft 38 through a geneva mechanism. Geneva wheel 66 is mounted co-axially with the conveyor wheel on rotatable shaft 28. The geneva cam 68 and drive pin 70 are mounted on drive shaft 38 and mate with and drive the geneva wheel 66.

In the illustrated apparatus the geneva cam 68 and drive pin 70 are adjacent rocker plate cam 72. Through appropriate linkage this cam controls the motion of rocker plate 52. Follower 75 biased by spring 76 transmits reciprocatory motion through rocker arm 78 to pin 80 which is mounted to rocker plate 52 at some non-central point. This causes the rocker plate to move on fulcrum 82. Through this rocking motion the ejector 26, press 20 and brander 22 reciprocate radially with respect to conveyor wheel 12.

The operation of appliance 10 is fairly easy to understand. The placer 14 receives a patty 18 from dispenser 44. As drive shaft 38 rotates, placer cam 36 causes placer 14 to descend so that placer ribs 50 are slightly below the upper end of micro grills 16. As the drive shaft rotates the conveyor wheel 12 through the geneva mechanism, the grill array and patty carried thereon move away from the placer ribs 50. At this point the placer ascends to accept the next patty. With the press 20 in the raised position shown in FIG. 2 the grill array and patty move under the press at which time the press pushes the patty onto the grill array. The press and brander 22 are then raised through rocker plate 52 motion so that the patty which is not impaled on the grill array moves into position below the brander 22. The rocker plate then lowers the brander to the position shown in FIG. 2a, and the desired char is affixed before it is raised.

The conveyor wheel 12 then carries the impaled patty into the reservoir for the cooking medium where it is cooked. The cooking time is directly related to the speed of the conveyor wheel so speed control 84 is provided to vary cooking time. Temperature control 86 regulates the temperature of cooking medium 24 through heating elements 58.

Heat from the heat transfer or cooking medium 24 passes through fins 30 to the micro grills 16 which cook the patty internally. Normally the fins will have approximately at least 20% more surface area than the micro grills so this creates a heat funnel action thus insuring temperature maintenance within the grill array.

Figure 2A:
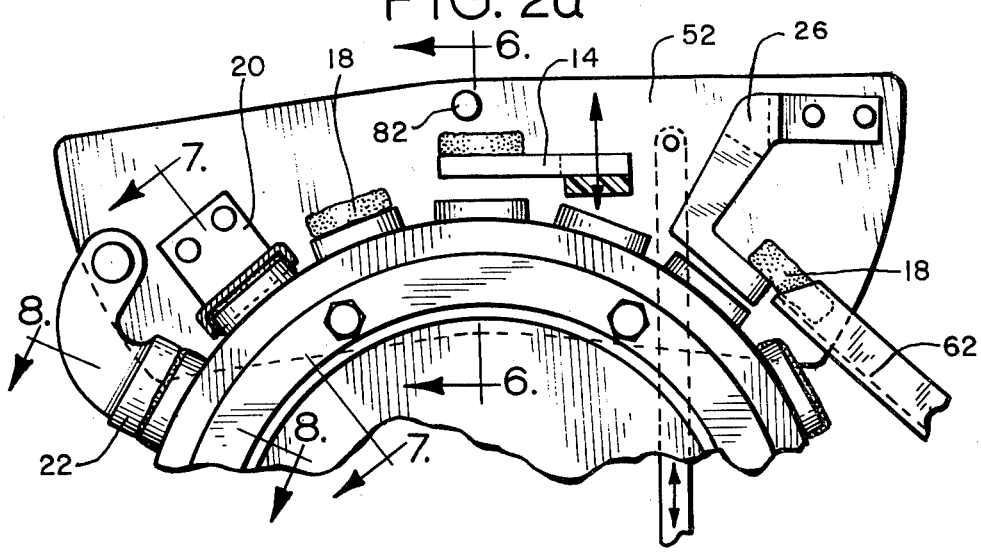
FIG. 2a is a cutaway side view of the appliance in the position where one patty has just been pressed onto a grill array while a cooked patty has just been ejected.

While FIGS. 2 and 2a show heat transfer fins 30 to be removed from the hot cooking medium at the top of the conveyor wheel, an alternate embodiment is designed so that the fins 30 will always be in contact with the heating medium, for example, in the illustrated apparatus the fins will remain immersed in the cooking medium so to prevent any possible cooling of the fins therefore maximizing efficiency.

The heat transfer or cooking medium also heats the outer surface of the patty with which it is in contact. Furthermore, the cooking medium also transfers heat to the exposed ends of the micro grills which may protrude through the outer surface of the patty. Accordingly, it can be seen that this heating of the outer part of the grills and the patty impaled thereon insures an even heating throughout the thickness of the patty.

As discussed hereinabove, the flavor cooking temperature range, or the temperature at which the inner part of a hamburger patty is actually cooking, is between 140° and 170° F. In a ¼ lb. hamburger of standard thickness this range is reached within 5 seconds. This temperature must be maintained for approximately 25 seconds so the conveyor wheel speed would normally be set so that each patty is submerged in the cooking medium for 30 seconds. This setting would naturally be adjusted if the temperature of the cooking medium and/or the size of the patty were varied.

After the conveyor wheel removes the cooked patty from the cooking medium, the patty passes above the ejector 22 which is in the lowered position shown in FIG. 2. The rocker plate 52 then raises the ejector to the position of FIG. 2a and the cooked patty is removed via chute 62.

Figure 10:
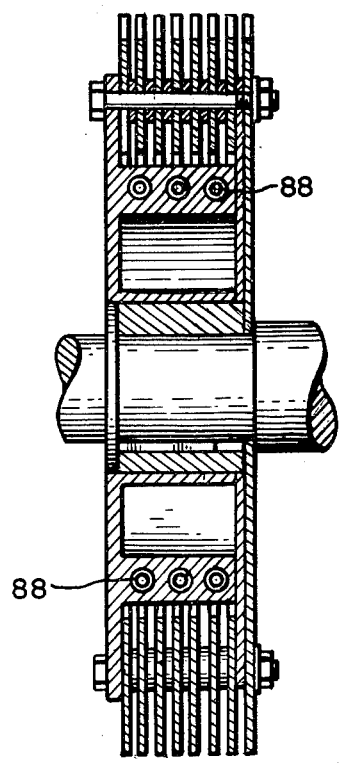
FIG. 10 is a sectional view of a conveyor wheel of the dry embodiment.

Another embodiment of the present invention is depicted in FIG. 10. Most of the apparatus is the same as that previously described, the primary difference being the heating medium. In this embodiment heat is imparted to heat transfer fins 30 by calrods 88 mounted on the inner periphery of the conveyor wheel 12. These heating elements may be stationary as illustrated with a sliding but thermally efficient connection between the elements and the fins 30, or may rotate with the conveyor wheel 12 with conventional slip rings (not shown) to provide electricity to the elements. In this so-called "dry" embodiment another set of heating elements may be positioned on the outside periphery of the conveyor wheel to insure the even cooking of the patties impaled on the grill means. These outer heating elements (not shown) would ordinarily be stationary.

A second embodiment of the present invention is illustrated in FIGS. 11, 12 and 13. This appliance 90 operates on the same principle as the first embodiment, i.e., a plurality of projecting grill means are set in a movable mounting means, which mounting means carries the grill means or micro grills and the patty impaled thereon into the heating medium. In this appliance 90, the movable mounting means is a reciprocable frame 92 which is reciprocated through a cam and rocker arrangement shown generally at 94. The micro grills are reciprocable with respect to the reciprocable frame as well as with respect to the stationary housing. Heat transfer fins 30 may also be carried by the frame 92. Flow slots 95 are provided in frame 92 so that the hot grease 24 has access to the fins 30. Above the frame, secured thereto, is an ejector, here a plate 96, through which the micro grills 16 fit. By moving the micro grills with respect to this plate the grills can be either inserted or retracted from the patty.

A movable cover 98, including a lid 100 is provided on the top of the appliance, with the cover 98 sliding in groove 102. Track 104 with an angularly displaced portion 106 mounts rollers 108 which are rotatably held by an extension of lid 100. The lid is spring biased toward the end of cover 98 so that its normal idle position is that in FIG. 11. The lid is of a configuration which allows it to fit under the cover so that by sliding the cover all the way to the right in the illustrated appliance, the rollers 108 move down track 104 to cause the lid 100 to seat securely on the appliance.

A frame cam 110 and a micro grill cam 112 rotate on the same axis and are driven by motor 113. The design of these cams is conventional so will not be dealt with in detail. Individual rockers 114 and 116 having conventional followers 118 and 120 and a common fulcrum 115 transfer the rotating eccentric motion into reciprocation of the frame 92 and the micro grills 16 via frame rod 117 and grill rod 119. In the depicted appliance the grill rod is interposed within the frame rod. The reciprocating parts of this appliance are situated in reservoir 56 which contains a hot cooking liquid, ordinarily grease 24. The grease 24 is heated by u-shaped heating element 121. Liquid seal 122 is provided to prevent leakage.

Heat transfer fins 30 mounted in the frame 92 are thermally connected to the micro grills 16 and therefore increase the amount of heat which is transferred to the grills, as with the first embodiment of the present invention. It is preferable that each grill and fin be one piece of material as shown. In this second embodiment the fins preferably remain immersed in the cooking medium at all times so to minimize heat loss.

In the cooking operation, the raw patty 18 is placed above frame 92. Cover 98 is then moved to the right so that the lid 100 is suspended over the patty. As the cover 98 continues in its path to the right the lid extension rollers 108 slide down the cover track 104 so that the lid 100 is tightly positioned over the frame as shown in FIG. 12.

Through grill cam 112 and rocker 116 the grills 16 move upward into the patty which is held in place by lid 100. This position is shown in FIG. 13. The frame 92, plate 96, and extended grills 16 then move downward as a unit into the cooking medium 24. After the patty has been sufficiently cooked, these same elements move upward as a unit to just below the original position. At this point the grills stop moving upward. The frame 92 and the ejection plate 96 carried therein continue their upward movement, so the relative movement therebetween causes retraction of the grills. The ejection plate 96 holds the patty above the frame 92 so the grills are cleanly removed. When the frame has reached its initial position, the cover/lid unit is slid away and the cooked patty removed.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. A method for rapidly cooking a hamburger patty in a water base cooking liquid, the steps comprising:
    providing a first zone for performing operations on a hamburger patty;
    providing a second zone containing a liquid cooking medium;
    said liquid cooking medium consisting essentially of a water base liquid;
    heating said liquid cooking medium to a temperature in the range from about 160° F. to about 210° F.;
    inserting into a hamburger patty in said first zone a plurality of heat conductive grill means of a sufficient number and spaced with sufficient proximities to facilitate rapid cooking of said hamburger patty;
    said plurality of grill means provided with heat transfer fins;
    said grill means inserted transversely into said hamburger patty and substantially penetrating said patty, with heat conductive areas of said heat transfer fins remaining in heat conductive relationship with the exterior of said hamburger patty;
    conveying said grill means, and said heat transfer fins, with said hamburger patty impaled thereon and immersing the same in said liquid cooking medium in said second zone;
    maintaining said heat transfer fins and said grill means with said hamburger patty impaled thereon in said liquid cooking medium for a time sufficient to cook portions exterior and interior to said hamburger patty;
    conveying said grill means with said hamburger patty out of said liquid cooking medium; and
    ejecting said grill means from within said hamburger patty.

2. The method of claim 1 in which a sufficient number of grill means are inserted and arranged in the hamburger patty so that they are spaced apart between about ¼ inch and about ⅛ inch.

3. A method for cooking a hamburger patty in a water base cooking liquid, which is adapted to cook a thick hamburger patty rapidly, economically, and efficiently, the steps comprising:
    providing a hamburger patty;
    providing a water base cooking liquid;
    heating said water base cooking liquid to a temperature of at least about 160° F.;
    impaling said hamburger patty with a plurality of heat conductive grill means of a sufficient number and arranged with sufficient proximities to facilitate rapid cooking of said hamburger patty;
    said grill means thermally connected to heat transfer fins which have areas that communicate with the environment exterior to said hamburger patty;
    rapidly bringing the interior portions of said hamburger patty to cooking temperatures in the range from about 140° F. to about 170° F., including conveying and submerging said grill means, and said heat transfer fins, with said hamburger patty impaled thereon, into said heated water base cooking liquid;
    maintaining said heat transfer fins and grill means with said hamburger patty impaled thereon in said water base cooking liquid for a time sufficient to cook portions exterior and interior to said hamburger patty;
    conveying said grill means with said hamburger patty out of said liquid cooking medium; and
    ejecting said grill means from within said hamburger patty.

4. The method of claim 3 in which a sufficient number of grill means are inserted and arranged in the hamburger patty so that they are spaced apart between about ¼ inch and about ⅛ inch.

5. A method for rapidly cooking a hamburger patty in a water base cooking liquid, the steps comprising:
    providing a first zone for performing operations on a hamburger patty;
    providing a second zone containing a liquid cooking medium;
    said liquid cooking medium consisting essentially of a water base liquid;
    heating said liquid cooking medium to a temperature in the range from about 160° F. to about 210° F.;
    inserting into a hamburger patty in said first zone a plurality of heat conductive grill means of a sufficient number and spaced with sufficient proximities to facilitate rapid cooking of said hamburger patty;
    said plurality of grill means provided with heat transfer fins;
    said grill means inserted transversely into said hamburger patty and substantially penetrating said patty, with heat conductive areas of said heat transfer fins remaining in heat conductive relationship with the exterior of said hamburger patty;
    conveying said grill means, and said heat transfer fins, with said hamburger patty impaled thereon and immersing the same in said liquid cooking medium in said second zone;
    maintaining said heat transfer fins and said grill means with said hamburger patty impaled thereon in said liquid cooking medium for a time sufficient to cook portions exterior and interior to said hamburger patty;
    conveying said grill means with said hamburger patty out of said liquid cooking medium; and
    ejecting said hamburger patty from said grill means.

6. The method of claim 5 in which a sufficient number of grill means are inserted and arranged in the hamburger patty so that they are spaced apart between about ¼ inch and about ⅛ inch.

7. A method for cooking a hamburger patty in a water base cooking liquid, which is adapted to cook a thick hamburger patty rapidly, economically, and efficiently, the steps comprising:

providing a hamburger patty;

providing a water base cooking liquid;

heating said water base cooking liquid to a temperature of at least about 160° F.;

impaling said hamburger patty with a plurality of heat conductive grill means of a sufficient number and arranged with sufficient proximities to facilitate rapid cooking of said hamburger patty;

said grill means thermally connected to heat transfer fins which have areas that communicate with the environment exterior to said hamburger patty;

rapidly bringing the interior portions of said hamburger patty to cooking temperatures in the range from about 140° F. to about 170° F., including conveying and submerging said grill means, and said heat transfer fins, with said hamburger patty impaled thereon, into said heated water base cooking liquid;

maintaining said heat transfer fins and grill means with said hamburger patty impaled thereon in said water base cooking liquid for a time sufficient to cook portions exterior and interior to said hamburger patty;

conveying said grill means with said hamburger patty out of said liquid cooking medium; and ejecting said hamburger patty from said grill means.

8. The method of claim 7 in which a sufficient number of grill means are inserted and arranged in the hamburger patty so that they are spaced apart between about $\frac{1}{4}$ inch and about $\frac{1}{8}$ inch.

* * * * *